(12) United States Patent
Spangler et al.

(10) Patent No.: US 6,327,350 B1
(45) Date of Patent: Dec. 4, 2001

(54) METHODS AND SYSTEMS FOR COLLECTING AND PROCESSING SIGNALING SYSTEM 7 (SS7) MESSAGE SIGNAL UNITS (MSUS)

(75) Inventors: Richard James Spangler; Steven Michael Freedman, both of Raleigh, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/537,075

(22) Filed: Mar. 28, 2000

Related U.S. Application Data
(60) Provisional application No. 60/127,889, filed on Apr. 5, 1999.

(51) Int. Cl.⁷ .......................... H04M 1/24; H04M 15/00; H04M 3/42; H04M 7/00

(52) U.S. Cl. .................. 379/115.01; 379/32.03; 379/207.15; 379/230; 379/145

(58) Field of Search .................... 379/1, 2, 5, 9, 379/10, 12, 13, 14, 15, 29, 30, 33, 34, 219, 229, 230, 207.15, 32.01, 32.03, 145

(56) References Cited

U.S. PATENT DOCUMENTS

| | | |
|---|---|---|
| 3,917,915 | 11/1975 | Karras . |
| 4,162,377 | 7/1979 | Mearns . |
| 4,191,860 | 3/1980 | Weber . |

(List continued on next page.)

FOREIGN PATENT DOCUMENTS

| | | |
|---|---|---|
| 0088639 | 9/1983 | (EP) . |
| 0212654 | 5/1987 | (EP) . |
| 0258654 | 3/1988 | (EP) . |
| 0264023 | 4/1988 | (EP) . |
| 58-215164 | 12/1983 | (JP) . |
| 62-200859 | 9/1987 | (JP) . |
| WO 84/01073 | 3/1984 | (WO) . |
| WO 86/03915 | 7/1986 | (WO) . |
| WO 88/00419 | 1/1988 | (WO) . |
| WO 01/20920 | 3/2001 | (WO) . |

OTHER PUBLICATIONS

Stusser, "Call Accounting Needs Five New Features," Business Communication Review, p. 45–48, (Sep. 28, 1988).

Szybicki, "Adaptive, Tariff Dependent Traffic Routing And Network management in Multi–Service Telecommunications Networks," Elsevier Science Publisher B.V., p. 614–621, (Sep. 4–11, 1985).

Hayward, "Traffic Enginnering in a New competitive Environment," Elsevier Science Publishers B.V., p. 1112–1116, (May 24, 1985).

Wang et al., "Database Administration System—Architecture and Design Issues," The Bell System Technical Journal, p. 2438–2458, (Nov. 24, 1982).

Wavtek Wandel Goltermann, "8620 SS7 Signaling Surveillance System," Switching Test Solutions AG, (Jun. 15, 1999).

Data Gulper, "Load your data warehouse 10 times faster. Concurrently load up to 500+ online feeds. Filter out useful data and store it quickly.," Compendium Research Corporation, (May 2, 1998).

(List continued on next page.)

Primary Examiner—Binh Tieu
(74) Attorney, Agent, or Firm—Jenkins & Wilson, P.A.

(57) ABSTRACT

A system for collecting and processing SS7 message signaling units (MSUs) includes a network interface for copying MSUs from an SS7 signaling link or a TCP/IP signaling link. A call detail record generator communicates with the link interface to receive the copied MSUs and parse the MSUs to extract desired parameters from the MSUs. An application interface kit received commands from an application to control the flow of MSU parameters to the application in real time.

43 Claims, 13 Drawing Sheets

U.S. PATENT DOCUMENTS

| | | |
|---|---|---|
| 4,310,727 | 1/1982 | Lawser . |
| 4,313,035 | 1/1982 | Jordan et al. . |
| 4,385,206 | 5/1983 | Bradshaw et al. . |
| 4,756,020 | 7/1988 | Fodale . |
| 4,769,834 | 9/1988 | Billinger et al. . |
| 4,788,718 | 11/1988 | McNabb et al. . |
| 4,897,835 | 1/1990 | Gaskill et al. . |
| 4,897,870 | 1/1990 | Golden . |
| 4,959,849 | 9/1990 | Bhusri . |
| 4,972,461 | 11/1990 | Brown et al. . |
| 5,008,929 | 4/1991 | Olsen et al. . |
| 5,150,357 | 9/1992 | Hopner et al. . |
| 5,291,481 | 3/1994 | Doshi et al. . |
| 5,315,580 | 5/1994 | Phaal . |
| 5,402,474 | 3/1995 | Miller et al. . |
| 5,426,688 | 6/1995 | Anand . |
| 5,430,709 | 7/1995 | Galloway . |
| 5,438,570 | 8/1995 | Karras et al. . |
| 5,457,729 | 10/1995 | Hamann et al. . |
| 5,473,596 | 12/1995 | Garafola et al. . |
| 5,475,732 | 12/1995 | Pester, III . |
| 5,506,893 | 4/1996 | Buscher et al. . |
| 5,521,902 | 5/1996 | Ferguson . |
| 5,539,804 | 7/1996 | Hong et al. . |
| 5,579,371 | 11/1996 | Aridas et al. . |
| 5,592,530 | 1/1997 | Brockman et al. . |
| 5,606,600 | 2/1997 | Elliott . |
| 5,712,908 | 1/1998 | Brinkman et al. . |
| 5,757,895 * | 5/1998 | Aridas et al. ..................... 379/136 |
| 5,768,352 | 6/1998 | Elliott et al. . |
| 5,774,532 | 6/1998 | Gottlieb et al. . |
| 5,784,443 | 7/1998 | Chapman et al. . |
| 5,867,558 * | 2/1999 | Swanson ............................... 379/34 |
| 6,028,914 | 2/2000 | Lin et al. . |
| 6,097,719 * | 8/2000 | Benash et al. ..................... 370/352 |
| 6,108,782 | 8/2000 | Fletcher et al. . |
| 6,111,946 | 8/2000 | O'Brien . |
| 6,134,307 | 10/2000 | Broukman et al. . |
| 6,137,869 | 10/2000 | Voit et al. . |
| 6,249,572 | 6/2001 | Brockman et al. . |

OTHER PUBLICATIONS

DSC Communications, "DSC Signs Agreements With Unisys For Intelligent Network Measurement And Monitoring Systems," Press Release, (Jul. 15, 1997).

Tekelec, "Proposal for MCI Billing System," (Nov. 2, 1993).

Blake, "Fast, Smart and In Control Signaling System 7 is Helping Bring The Intelligent Network to the End User," In Perspective, p. 20–23, (May 2, 1993).

Kritzmacher et al., "Recommendations for SS7 Reliability," TE&M, p. 35–36, 38, (Nov. 1, 1992).

Bellcore, "Request for Industry Input: Extending a Signal Transfer Point Adjunct Beyond Usage/Billing Measurements," Digest, p. 33, (Jun. 2, 1992).

Tekelec, "IDS Enhanced Gateway Billing System User's Manual," (Jan. 22, 1992).

Federal Communications Commission, "Notice of Inquiry," Federal Communications Commission, (Dec. 6, 1991).

Tekelec, "The Mate User's Manual," (Oct. 18, 1991).

Tekelec, "Intelligent Database Services Billing System User's Manual," p. 1–1–2–18, (Apr. 2, 1991).

Lanning, "SS7 Interconnection Awaits Green Light," Telephony's Transmission Special, p. 32, 34, (Nov. 2, 1990).

Anonymous, "Intelligent Networking: CCS7 Message Detal Recording Enables Usage–Sensitive Billing at Gateway DMS–STPs," p. 4–5, (Jul. 2, 1990).

Telecordia Technologies, "A Framework of High–Level Requirements and Considerations for Common Channel Signaling Network Usage Measurements to Support Billing and Bill Verification," Framework Technical Advisory, p. 1–40, A–1–R–4, (Jan. 2, 1990).

Buckles, "SS7 Gateways Serve and Protect," Telephony, p. 39–41, 44, (Nov. 20, 1989).

Anonymous, "An Independent Future," Rural Telecommunications, (1989).

Anonymous, "A New Network," TE&M, (Dec. 1, 1988).

Marshall, "Maintaining the CCS Network," TE&M, p. 78–80, (Nov. 1, 1988).

Anonymous, "Independent SS7 Network Questions and Answers," (Aug. 2, 1988).

Parsons, "Update: Financial Considerations and Network Control Most Important for Independent Telcos Examining SS7," p. 1–4, (Aug. 2, 1988).

Hilton et al., "Common Channel Signaling for Independents," TE&M, (Jun. 15, 1988).

Anonymous, "Independent SS7 Network SSP Solutions," (May 2, 1988).

Parsons, "A800: A Decision to Remain Independent," p. 1–4, (May 2, 1988).

Protocol Technologies, "#7 MGTS Monitor Trap Overview," MGTS User's Guide p. 5.9.0–5.9.36 (Dec. 2, 1987).

Protocol Technologies, "Protocol Technologies User's Guide: Message Generator/Traffic Simulator," p. 1–1–8–2, (Apr. 2, 1987).

Anonymous, "Automatic Message Accounting Teleprocessing System (AMATPS) Generic Requirements," Telcordia Technologies, Inc., (Abstract Only) (Sep. 2, 1986).

Anonymous, "Systems Engineering Requirements for the 1ESS Switch Automatic Message Account Transmitter (AMAT)," Telcordia Technologies, Inc., (Abstract Only) (Nov. 2, 1985).

Danar Corporation, "About Syzgy," (Downloaded Jul. 14, 1999).

Anonymous, "Billing Usage Measurements/Automatic Message Accounting," Telcordia Technologies, Inc. Project Abstracts (Publication Date Unknown).

Nortel, "CCS7 Message Recording/Billing," (Publication Date Unknown).

Sette, "Intermediate Signaling Network Identification," Bellcore, p. 1–10, (Publication Date Unknown).

Sette, "Intermediate Signaling Network Identification," (Publication Date Unknown).

Titch, "The Pipe and the Protocol," Closeup Supplement to Communications Magazine (1988).

General Signal Networks, "SS7 Performance Management System," www.gsnetworks.com/powerof7/index.html (Downloaded Jul. 18, 1999).

Anonymous, "The Sterling Data Server Family: The Advanced Intelligent Network Billing Mediation Platform," Telesciences, (Publication Date Unknown).

Anonymous, "Sterling 5000 Data Processing & Management System: Real Time Billing Data Collection and Processing System," Telesciences, (Publication Date Uknown).

Rose, "Understanding the Intelligent Network," Opastco Roundtable (1988).

Anonymous, "Block Diagram of Unisys SS7 Billing System," (Publication Date Unknown).

Homisco/Voicenet Inc., "Features," www.homisco.com/SS7/page7.html(Downloaded Jul. 14, 1999).

Tekelec, "Eagle STP: STP–LAN Interface Feature," (May 2, 1997).

Anonymous, "Operations, Maintenance and Administration Part," International Telecommunications Union, p. 485–531, (Jul. 27, 1999).

Hanley, "Fight for the Future: Test Vendors Try To Get The Edge On Unstandardized Technology With Flexible, Forward–Thinking Products," Telephony, p. 52–54, (Mar. 8, 1999).

Hewlett Packard, "HP acceSS7 Signaling Monitoring System," Hewlett Packard Co., (May 2, 1995).

Tekelec, "Common Channel Signaling System 7 Link Monitoring," Response to Request for Proposal from Southwestern Bell Telephone (Jul. 2, 1993).

Bellcore, "Generic Requirements for Common Channel Signaling (CCS) Network Usage Measurement Functionality," Technical Advisory, p. 1–76, (Dec. 2, 1992).

Hester, "Can You Afford To Be Without SS7 Network Surveillance," Telephony, (Dec. 3, 1990).

Rusin, "Voice Processing And The Intelligent Network," TE&M, p. 51–68, (Mar. 1, 1989).

Protocol Technologies, "Template Trap and Trace," p. 7–1–7–52, (Feb. 2, 1989).

Chow et al., "CCITT Signaling System No. 7: The Backbone For Intelligent Network Services," Globecom, p. 40.1.1–40.1.5, (1987).

Faletti et al., "Signaling System #7: The Corporate Network Backbone," IEEE Global Telecommunications Conference, Hollywood, Florida, p. 10.2.1–10.2.9, (1988).

Worrall, "Virtual Network Capabilities—The Next Phase Of The 'Intelligent Network'," Globecom, (1987).

Anonymous, "American National Standard For Telecommunications—Monitoring and Measurements For Signaling System 7 Networks," (1988).

* cited by examiner

| Bit Pattern | Type | |
|---|---|---|
| 00000001 | GET | used to get data from CDR GEN |
| 00000010 | SET | used to set CDR GEN characteristic |
| 00000100 | RESPONSE | response to CDR GEN command |
| 00001000 | TRAP | asynchronous message sent from CDR GEN to application |

| Bit Pattern | Identifier |
|---|---|
| 00000000 | Stop sending CDRs in real-time |
| 00000001 | Start sending CDRs in real-time without filtering |
| 10000001 | Start sending CDRs in real-time with filtering |
| 00000010 | Start sending Intermediate CDRs in real-time without filtering |
| 10000010 | Start sending Intermediate CDRs in real-time with filtering |
| 00000100 | Stop sending MSUs in real-time |
| 00001000 | Start sending MSUs in real-time without filtering |
| 10001000 | Start sending MSUs in real-time with filtering |
| 00010000 | Retrieve CDRs in bulk |
| 00100000 | Retrieve MSUs in bulk |
| 01000000 | User configuration |

FIG. 10(c)

METHODS AND SYSTEMS FOR COLLECTING AND PROCESSING SIGNALING SYSTEM 7 (SS7) MESSAGE SIGNAL UNITS (MSUS)

PRIORITY APPLICATION INFORMATION

This application claims the benefit of United States Provisional Patent Application No. 60/127,889 filed Apr. 5, 1999, the disclosure of which is incorporated herein by reference in its entirety.

TECHNICAL FIELD

The present invention relates to methods and systems for processing SS7 MSUs. More particularly, the present invention relates to methods and systems for creating call detail records (CDRs) from SS7 MSUs.

FIELD OF THE INVENTION

SS7 is a common channel signaling protocol used by SS7 nodes to provide telecommunications services to end users. Messages that are transported between SS7 nodes to provide telecommunications services are referred to as signal units. There are three types of SS7 signal units: message signal units (MSUs); fill in signal units (FISUs); and link status signal units (LSSUs). FISUs are transmitted between SS7 nodes to constantly evaluate the status of SS7 links. FISUs do not carry any information relating to a call. LSSUs are sent between two signaling points to evaluate the status of a link between the two signaling points. Like FiSUS, LSSUs do not contain any information relating to a call. Message signal units carry routing information, user part information, and application part information relating to a call.

Many SS7 MSUs can be transmitted between SS7 nodes during a call. Accordingly, it is desirable to capture the SS7 MSUs and process the SS7 MSUs to generate call detail records. As used herein, a call detail record refers to any information extracted from one or more SS7 MSUs that can be used by an application to perform a specific function. For example, a call detail record for a call duration billing application may contain ISDN user part (ISUP) messages for a call. A call detail record for an interconnect billing application may contain transaction capabilities application part (TCAP) query and response MSUs. A call detail record for a calling card fraud detection application may contain both ISUP MSUs and TCAP query and response MSUs.

There are a variety of known systems for capturing and processing SS7 MSUs. For example, U.S. Pat. No. 5,592,530 entitled "Telephone Dual Switch Monitors" discloses monitors that connect to a mated pair of SS7 signal transfer points (STPs). The monitors implement primary and secondary state machines to generate partial CDRs at each switch. Implementing primary and secondary state machines and generating partial CDRs at each switch increases the complexity of monitoring software. This complexity adds to the delay in CDR creation and prevents real time access to CDRs by downstream devices.

U.S. Pat. No. 5,438,570 entitled "Service Observation Equipment for Signaling System Seven Telephone Network" describes another system for monitoring an SS7 network. The system includes service observation equipment that connects to SS7 signaling links between an SS7 signaling point (SP) and an STP and to audio trunk connections between SS7 SPs. The monitoring of trunk connections in addition to SS7 signaling links increases the complexity of the monitoring equipment. Such complexity is unnecessary in modern common channel signaling networks where control information required to establish a call is sent exclusively on a separate channel from the voice trunks. In addition, the monitoring of SS7 MSUs at an SSP as described in the '570 Patent does not present the same correlation problems as monitoring MSUs at a mated pair of STPs because all messages sent to or from the SSP are guaranteed to pass through a single monitoring device.

U.S. Pat. No. 5,579,371 entitled "Common Channel Signaling Network Applications Platform" provides a platform for diverse application programs to analyze SS7 signaling units. SS7 signaling units are filtered according to categories and type based on filters configured by a master station. The filters comprise linked lists of filtering criteria. Applications running on a separate machine from the master station receive the filtered MSUs. There is no disclosure of commands usable by the applications themselves to control filtering. Thus, while the '371 Patent discloses a common channel signaling network applications platform, control of the filtering and flow of the MSUs to an application must be manually performed by the operator of the master station.

U.S. Pat. No. 5,008,929 entitled "Billing System for Telephone Signaling Network" discloses a billing system for a telephone signaling network. The billing system processes SS7 MSUs to produce usage data. The usage data indicates the service recipients and the service providers for the MSUs. The '929 Patent does not disclose an application interface for controlling the processing of MSUs or a method by which MSUs relating to a call are correlated.

In light of these difficulties associated with the prior art, there exists a long-felt need for novel methods and systems for processing SS7 MSUs.

SUMMARY OF THE INVENTION

According to one aspect, the present invention provides a system for processing SS7 MSUs. In the system, a monitoring device receives SS7 MSUs from SS7 signaling links. A call detail record generator receives the SS7 MSUs and processes the SS7 MSUs to create call detail records from the MSUs. An application interface kit (AIK) allows applications to control the flow and content of CDRs produced by the CDR generator.

Embodiments of the present invention will be described with reference to block diagrams and flow charts illustrating process components and steps for collecting and processing SS7 MSUs. It is understood that each of these components and steps can be implemented by computer-executable instructions embodied in a computer-readable medium. Alternatively, the process components and steps can be implemented entirely in hardware. In yet another alternative, the process components and steps can be implemented by a combination of hardware and software.

Accordingly, it is an object of the present invention to provide novel methods and systems for collecting and processing SS7 MSUs.

Some of the objects of the invention having been stated hereinabove, other objects will be evident as the description proceeds, when taken in connection with the accompanying drawings as best described hereinbelow.

BRIEF DESCRIPTION OF THE DRAWINGS

The present invention will now be explained with reference to the accompanying drawings, of which:

FIGS. 10(a)–10(c) are data structure diagrams illustrating exemplary commands usable by applications for controlling the flow of MSUs and CDRs according to an embodiment of the present invention;

DETAILED DESCRIPTION OF THE INVENTION

Figure 1:
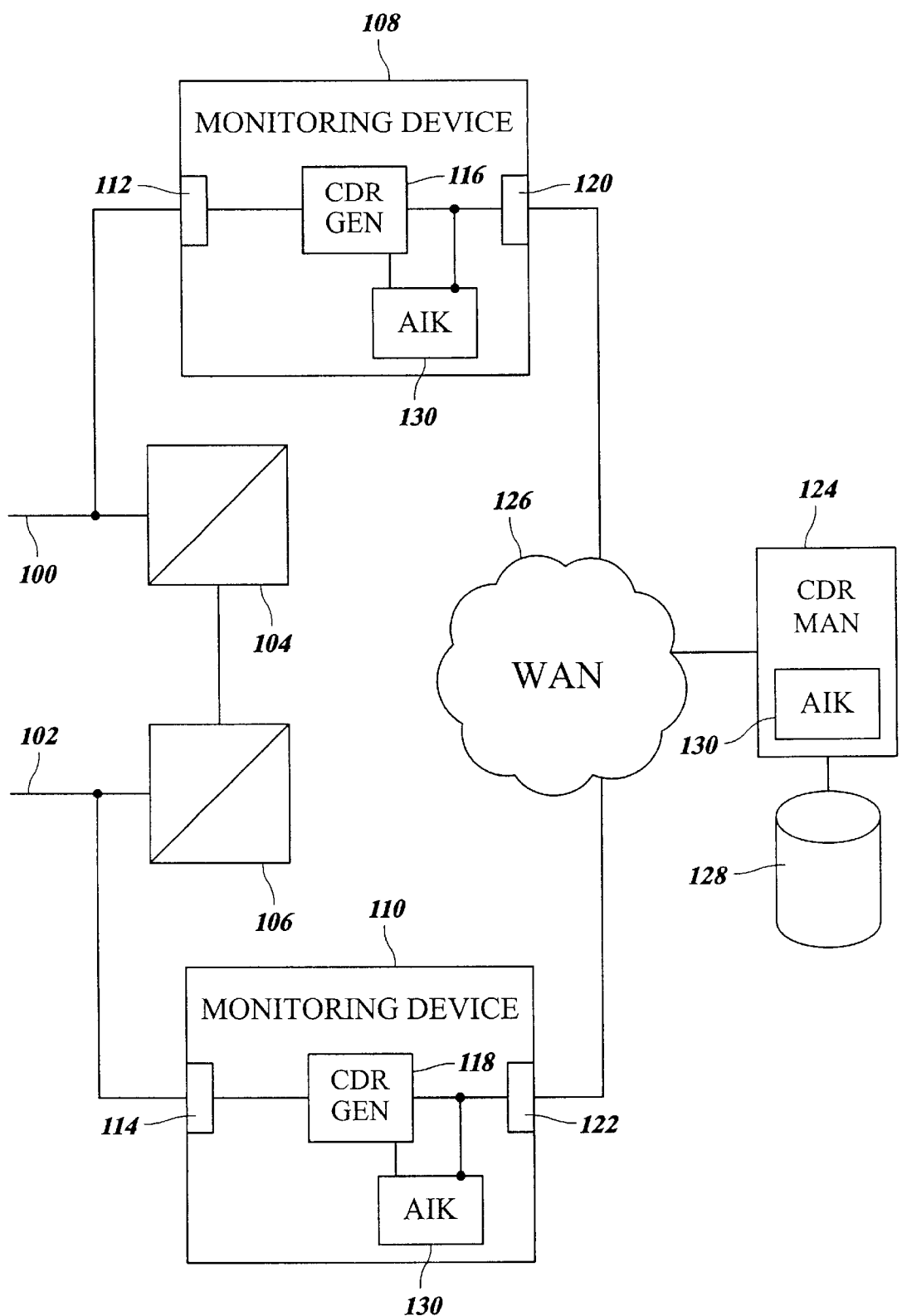
FIG. 1 is a block diagram illustrating a system for processing SS7 MSUs to generate call detail records according to an embodiment of the present invention.

According to one embodiment, the present invention includes a system for processing SS7 MSUs to generate call detail records. FIG. 1 illustrates a system for processing SS7 MSUs to generate call detail records according to an embodiment of the present invention. In FIG. 1, SS7 MSUs are transmitted over signaling links 100 and 102. In the illustrated example, signaling links 100 and 102 provide SS7 MSUs to STPs 104 and 106. Signaling links 100 and 102 may comprise SS7 signaling links, such as access links, that connect STPs 104 and 106 to SSPs or SCPs, bridge links that connect STPs 104 and 106 to other mated STPs, diagonal links that connect STPs 104 and 106 to other mated pairs of STPs at a different hierarchical level, or extended links that connect STPs 104 and 106 to a remote STP. Attentively, signaling links 100 and 102 may comprise IP signaling links that carry SS7 MSUs over an IP network such as a TCP/IP network or a UDP/IP network. It is understood that each of signaling links 100 and 102 may represent one physical link or a plurality of physical links.

In order to monitor MSUs on signaling links 100 and 102, the present embodiment includes monitoring devices 108 and 110. The monitoring devices include first interfaces 112 and 114 for copying SS7 MSUs from signaling links 100 and 102, CDR generator software 116 and 118 for processing MSUs received from the signaling links into CDRs, and second interfaces 120 and 122 for communicating CDRs and MSUs to downstream devices.

In the illustrated embodiment, monitoring devices 108 and 110 are co-located with, but external to STPs 104 and 106. In an alternative embodiment, monitoring devices 108 and 110 may be integrated within STPs 104 and 106. Communication between monitoring devices 108 and 110 and STPs 104 and 106 will be discussed in more detail below.

CDR manager 124 communicates with monitoring devices 108 and 110 via wide area network (WAN) 126 to receive CDRs and MSUs from monitoring devices 108 and 110. CDR manager 124 is a software entity that executes on a general purpose computer to receive CDRs and store CDRs in bulk storage 128. In the illustrated embodiment, CDR manager 124 receives CDRs generated by two monitoring devices 108 and 110. However, the present invention is not limited to receiving CDRs from two monitoring devices connected to a mated pair of STPs. In an alternative embodiment, CDR manager may receive CDRs from a single monitoring device or more than two monitoring devices. For example, CDR manager 124 may be located at a control site for a telecommunications service provider and receive CDRs from monitoring devices located at each STP owned by the service provider.

According to an important aspect of the invention, monitoring devices 108 and 110 and/or CDR manager 124 may include application interface kits 130 for receiving commands from applications and processing the commands to dynamically control the flow and content of CDRs and MSUs to the applications. For example, applications, such as billing applications, billing verification applications, fraud detection applications, looping detection applications, mass call detection applications, etc., can use a set of commands to instruct application interface kits 130 to start transmitting CDRs and/or MSUs, stop transmitting CDRs and/or MSUs, or change the content of CDRs and/or MSUs sent to applications. An exemplary set of commands will be discussed in more detail below.

Monitoring Device

Figure 2:
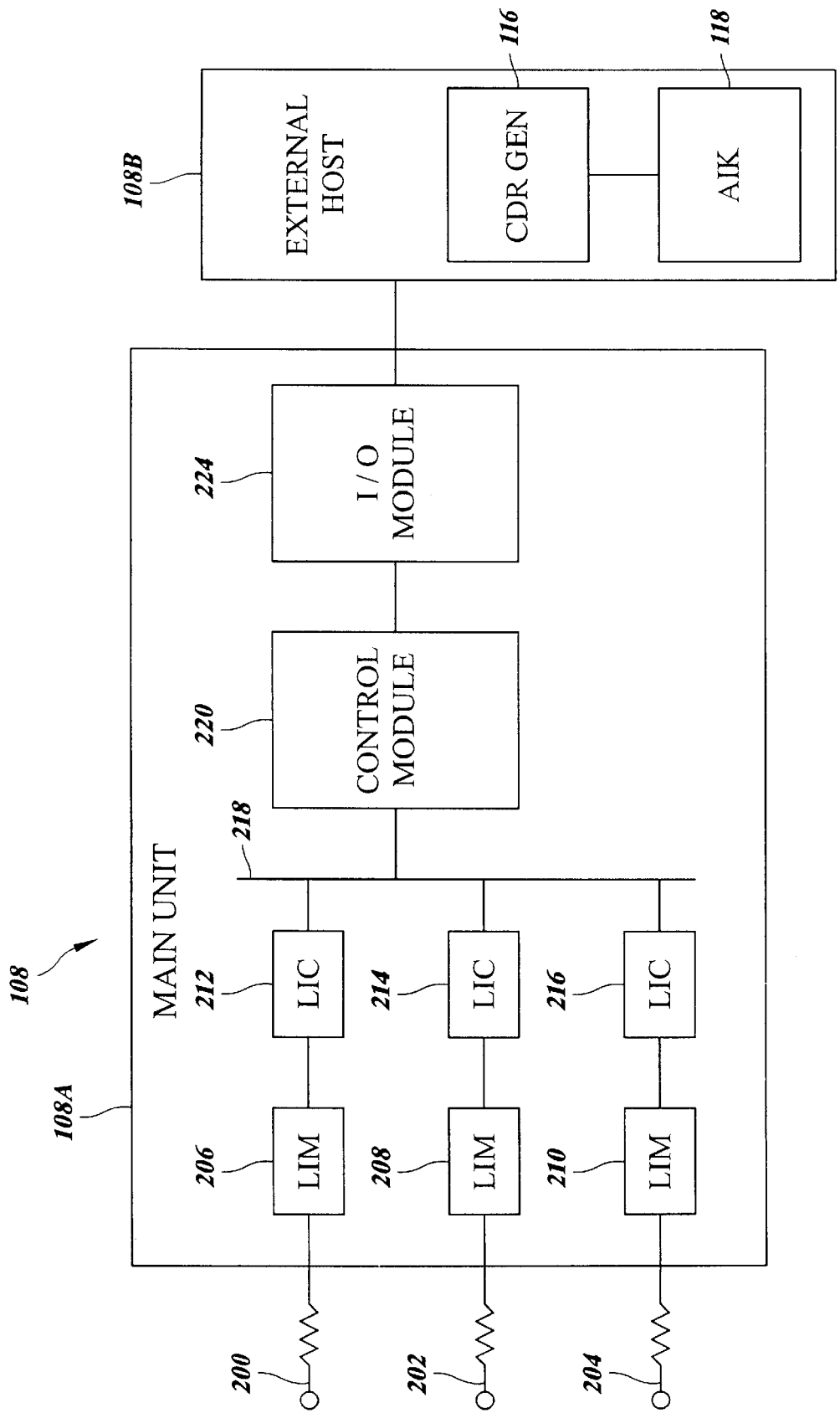
FIG. 2 is a block diagram of a monitoring device configured to operate externally from an STP according to an embodiment of the present invention.

FIG. 2 illustrates an example of a monitoring device according to an embodiment of the present invention. The monitoring device illustrated in FIG. 2 is adapted to monitor signaling links at an STP at a location external to the STP using link probes to physically access the signaling links. In the illustrated embodiment, monitoring device 108 includes a main unit 108A and an external host 108B. Main unit 108A includes hardware and software for copying MSUs from the signaling links. For example, main unit 108A may include link probes 200, 202, and 204 for physically accessing the signaling links. Link probes 200, 202, and 204 are preferably high-resistance probes relative to the signaling links to avoid interfering with signals on the signaling links. Link interface modules (LIMS) 206, 208, and 210 receive signals from link probes 200, 202, and 204 and convert the raw signals into frames. The configuration of each LIM depends on the physical transfer medium of the link being monitored. For example, if signaling link is a T1 link, LIMs 206, 208, and 210 may be adapted to convert the T1 signal to frames, such as SS7 or Ethernet frames. Similarly, if a signaling link is an E1 link, LIMs 206, 208, and 210 may be configured to convert E1 signals to SS7 or Ethernet frames. If a signaling link is a DS0 link, LIMs 206, 208, and 210 may be configured to convert the DS0 signals to SS7 or Ethernet frames.

Link interface controllers (LICs) 212, 214, and 216 receive the messages output from LIMs 206, 208, and 210 and perform SS7 layer 2 processing on the messages to ensure that duplicate copies of the same messages are not forwarded to downstream devices. Thus, the outputs of LICs 212, 214, and 216 are single copies of SS7 messages.

Bus 218 interconnects link interface controllers 212, 214, and 216 and connects the link interface controllers to a control module 220. Control module 220 contains the central processor and associated program memory for the monitoring device. Exemplary functions performed by control module 220 include communicating with external host 108B through I/O module 224, managing system errors, controlling remote diagnostic selection, and controlling system clocks. For purposes of explaining the present invention, the most important function performed by control module 220 is communicating SS7 MSUs to external host 108B through I/O module 224. I/O module 224 includes an appropriate hardware interface for communicating with external host 108B. In a preferred embodiment, I/O module 224 includes an Ethernet transceiver for communicating SS7 MSUs to external host 108B via an Ethernet interface. In an alternative embodiment, I/O module 224 may be configured to communicate over a serial interface, such as an RS-232 interface.

An exemplary commercially available device usable as main unit 108A is the main unit provided by the Message Generator/Traffic Simulator (MGTS), available from Tekelec of Calabassas, Calif. The main unit of the MGTS includes the components illustrated in FIG. 2, as well as additional components that are not essential in explaining the present invention.

External host 108B comprises a computing device, such as a personal computer or a workstation having sufficient processing capacity to process MSUs received from I/O module 224. An exemplary hardware and software platform suitable for use as external host 108B is an Ultra 5 workstation running Solaris 2.0, available from Sun Microsystems, Inc. of Palo Alto, Calif. An alternative hardware and software platform suitable for use as external host 108B is a personal computer, such as an IBM-compatible personal computer running a WINDOWS®-based operating system. In the illustrated embodiment, external host 108B includes CDR generator 116 for generating CDRs from MSUs received from I/O module 224 and application interface kit 118 for allowing applications to control the flow of CDRs and/or MSUs from CDR generator 116.

The present invention is not intended to be limited to a monitoring device including a main unit 108A and an external host 108B. For example, in an alternative embodiment, the functions performed by external host 108B may be executed by a processor within control module 220 of main unit 108A. Thus, a monitoring device according to the present embodiment includes configurations in which MSU copying and processing functions are integrated within a single physical device and configurations in which MSU copying and processing functions are implemented within separate physical devices that communicate with each other.

Figure 3:
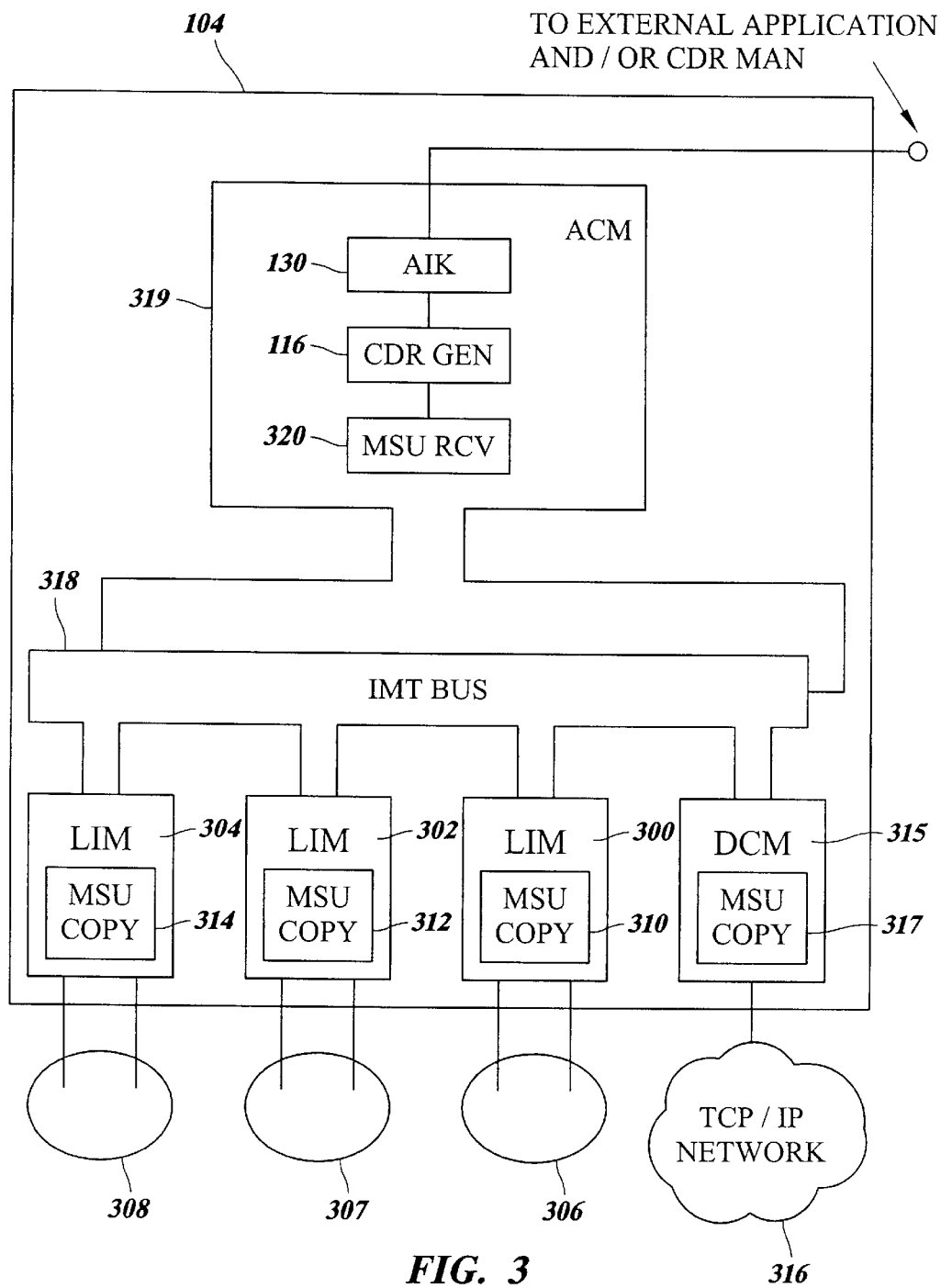
FIG. 3 is a block diagram of an STP with internal MSU capturing and CDR generation according to an embodiment of the present invention.

The present invention is not limited to the external monitoring device illustrated in FIG. 2. For example, in an alternative embodiment, the monitoring device may be integrated within an STP. FIG. 3 illustrates an integrated monitoring device according to an embodiment of the present invention. In the illustrated embodiment, monitoring and CDR generation functionality is integrated within STP 104. STP 104 includes link interface modules (LIMs) 300, 302, and 304 for sending and receiving SS7 signal units over SS7 signal links 306–308. LIMs 300, 302, and 304 each include hardware, such as a microprocessor and associated memory, for executing programs for interfacing with SS7 signaling links 306–308. Unlike LIMs 206, 208, and 210 in the external monitoring device illustrated in FIG. 2, which are capable of only receiving MSUs from SS7 signaling links, LIMs 300, 302, and 304 are capable of both sending and receiving MSUs. MSU copy modules 310, 312, and 314 reside on LIMs 300, 302, and 304 for identifying and copying SS7 MSUs incoming on signaling links 306–308.

The present invention is not limited to copying MSUs incoming to an STP on SS7 signaling links. For example, in addition to copying MSUs incoming on SS7 signaling links, STP 104 may include data communications module (DCM) 315 for sending and receiving SS7 MSUs via TCP/IP network 316. DCM 315 may include appropriate hardware, such as a microprocessor and associated memory for executing programs for interfacing with TCP/IP network 316. A detailed description of DCM card functionality is found in commonly-assigned and copending U.S. patent application Ser. No. 09/443,712 entitled "Methods And Systems For Communicating Signaling System 7 (SS7) User Part Messages Among SS7 Signaling Points (SPs) And Internet Protocol (IP) Nodes Using Signal Transfer Points (STPs)", the disclosure of which is incorporated herein by reference in its entirety. In addition, although not illustrated in FIG. 2, it is understood that DCM functionality for copying MSUs received over a TCP/IP signaling link may be included in a monitoring device that resides external to an STP.

An interprocessor message transfer bus 318 provides a communication link between LIMs 300, 302, and 304, DCM 315, and application control module (ACM) 319. ACM 319 includes hardware and software for sending SS7 MSUs to an external host via a TCP/IP interface. In the illustrated embodiment, ACM 319 includes MSU receive module 320 for receiving copies of MSUs from IMT bus 318, CDR generator 116 for processing the MSUs into CDRs, and application interface kit 130 for controlling the flow of MSUs/CDRs to external applications. MSU receive module 320 interfaces with bus 318 to receive copies of MSUs from bus 318. CDR generator 116 and application interface kit 130 will be described in more detail below.

The present invention is not limited to the embodiment illustrated in FIG. 3 in which the MSU copying functionality and the CDR generation functionality resides within STP 104. For example, in an alternative embodiment, the MSU copying functionality may be internal to the STP and the CDR generation functionality may be external to the STP. Thus, in an alternative embodiment, STP 104 may include MSU copy modules 310, 312, 314, and 317 and MSU receive module 310. However, application interface kit 130 and CDR generator 116 may be implemented on a host external to the STP that communicates with MSU receive module 310 through an appropriate interface, such as a TCP/IP interface.

A suitable STP that may be modified to include the CDR generation functionality illustrated in FIG. 3 is the EAGLE® STP available from Tekelec of Calabassas, Calif. The EAGLE® STP includes DCM cards and LIM cards as illustrated in FIG. 3, as well as additional functionality that is not relevant to a discussion of the present invention.

CDR Generator

Figure 4:
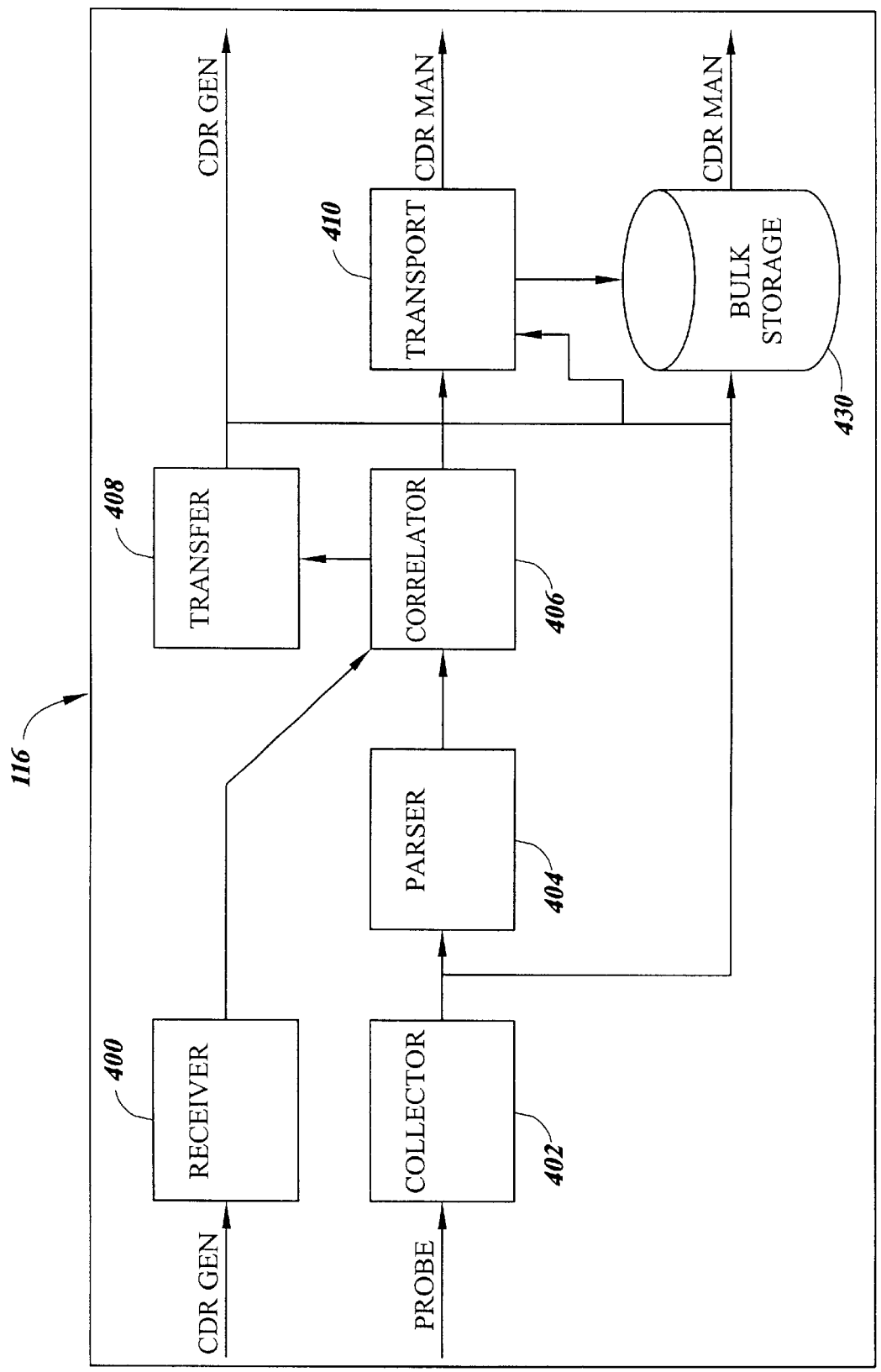
FIG. 4 is a block diagram of a CDR generator program according to an embodiment of the present invention.

FIG. 4 is a block diagram of an exemplary CDR generator program according to an embodiment of the present invention. Referring to FIG. 4, CDR generator 116 includes a receiver 400 for receiving MSUs from the CDR generator program monitoring the other side of a mated pair of STPs. For example, receiver 400 may be an application-layer interface that communicates with the other CDR generator program via TCP/IP or other appropriate protocol. Collector 402 communicates with I/O module 224 illustrated in FIG.

2 or with MSU receive module 320 illustrated in FIG. 3 to receive copies of SS7 MSUs. Accordingly, collector 402 may include Ethernet hardware for communicating with I/O module 224 or bus interface circuitry for communicating with MSU receive module 320.

Parser 404 extracts parameters from the MSUs, such as the parameters required for CDR generation. Correlator 406 is responsible for correlating MSU fragments from parser 404 and receiver 400 into complete CDRs. Correlator 406 forwards message fragments to transfer block 408 if the MSU or MSU fragment is for a call that originated at the other CDR generator. For example, if a call originated at a monitoring device associated with a first STP of a mated pair of STPs, transfer block 408 forwards the MSU to the monitoring device associated with the other STP of a mated pair of STPs.

This forwarding of messages between monitoring devices allows only one CDR generator to generate a CDR for a call. This system can be contrasted with the system described in U.S. Pat. No. 5,592,530 referenced above where each monitor connected to an STP generates a partial CDR. According to the present embodiment, each MSU received by a CDR generator program that does not belong to a call originating at the receiving CDR generator program is forwarded to the other CDR generator program. This increases the speed and decreases the complexity of CDR generation over the system described in the '530 Patent discussed above.

Transport block 410 sends CDRs received from correlator 408 to bulk storage 430 and to CDR manager 124 illustrated in FIG. 1. Transport block 410 may communicate with bulk storage and CDR manager 124 using any suitable protocol for transferring large amounts of data, such as file transfer protocol (FTP). Application interface kit 130 illustrated in FIG. 1 may communicate with transport block 410 and/or bulk storage 430 to control the flow and content of CDRs to applications.

Parser

Figure 5:
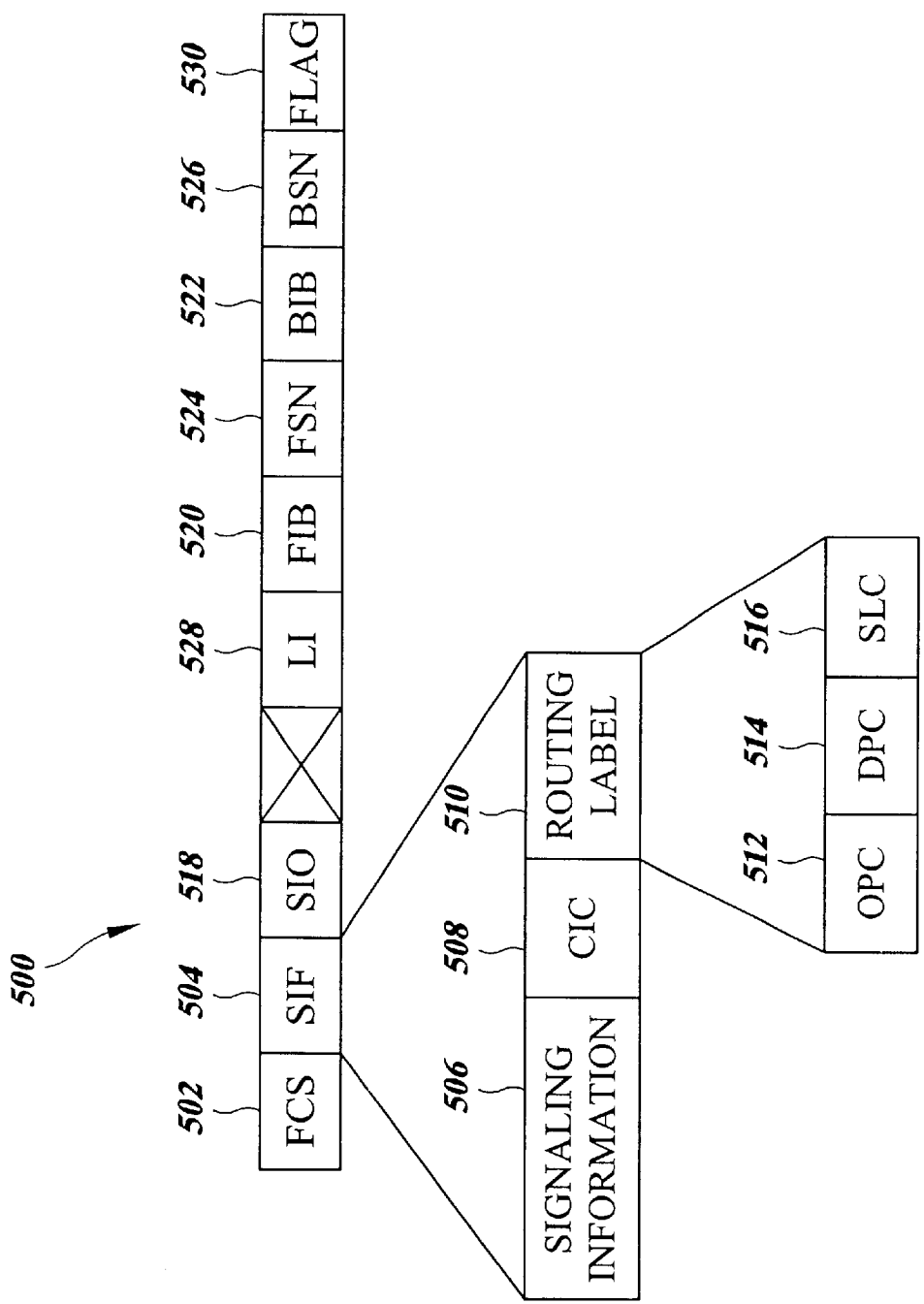
FIG. 5 is a block diagram illustrating an SS7 MSU.

As stated above, parser 404 parses MSUs received from collector 402 to extract parameters required for CDR generation. FIG. 5 illustrates exemplary parameters that may be included in an SS7 MSU. In FIG. 5, MSU 500 includes a plurality of fields used by SS7 nodes to perform call signaling and network management functions. The most significant field in MSU 500 is frame check sequence (FCS) field 502. FCS field 502 is used by SS7 network management to determine if there are errors in the MSU. The next field in MSU 500 is service information field 504. Service information field 504 includes up to 272 octets of user data. In SS7, user data is information from an upper layer protocol, such as ISUP or TCAP. The user data also includes routing information used by lower level protocols to route the MSU to the proper destination.

Service information field 504 is divided into signaling information field 506, circuit information code (CIC) code field 508 and routing label 510. Signaling information field 506 carries protocol-specific information. For example, if MSU 500 is an ISDN user part (ISUP) MSU, signaling information field 506 may carry an initial address message (IAM) and its associated parameters.

Circuit identification code field 508 identifies the circuit being set up or released by an ISUP message. For example, the circuit identification code may identify a voice trunk or any other transmission medium in the public switched telephone network. Routing label 510 includes addresses for routing MSU 500. For example, routing label 510 includes originating point code (OPC) field 512, destination point code (DPC) field 514, and signaling link selection field 516. Originating point code field 512 stores the point code of the SS7 node that originated the message. Destination point code field 514 stores the point code of the SS7 node to which the message is to be routed. Signaling link code field 516 stores a signaling link code that indicates the signaling link used to route the message.

The signaling information stored in service information field 504 may be useful in generating call detail records. For example, a call duration billing system may require information regarding call setup, call teardown, and voice trunk used. This information is contained in ISUP messages. In an ISUP message sequence, it is necessary to determine the message type to properly sequence ISUP messages. Information in CIC field 308 and routing label field 310, such as OPC and DPC may be useful to correlate messages. Accordingly, parser 404 illustrated in FIG. 4 may extract one or more of these fields from MSU 500 generating a call detail record for a call duration billing application.

Service indicator octet (SIO) field 518 identifies the level 4 protocol of the message. For example, the SIO field may indicate that the level 4 protocol is ISUP, transaction capabilities application part (TCAP), or mobile application part (MAP). This information may also be useful in order to generate CDRs. Accordingly, parser 404 illustrated in FIG. 2 may also extract values from SIO field 518 of MSU 500.

The remaining fields in MSU 500 are used by lower level SS7 software for error detection and retransmission. For example, forward indicator bit field 520 and backwards indicator bit field 522 contain values utilized to control retransmission of messages. Forward sequence number field 524 and backwards sequence number field 526 contain values for sequencing SS7 messages. Link indicator field 528 stores a value representing the length of message signal unit 500. This field is useful to allow determination of the type of signal unit being received. For example, if the value in the length indicator field is greater than two, the signal unit is a message signaling unit. Flag field 530 stores bits that indicate the start of an SS7 message. These remaining fields are generally not used in CDR generation but a discussion thereof is included herein for completeness.

Figure 6:
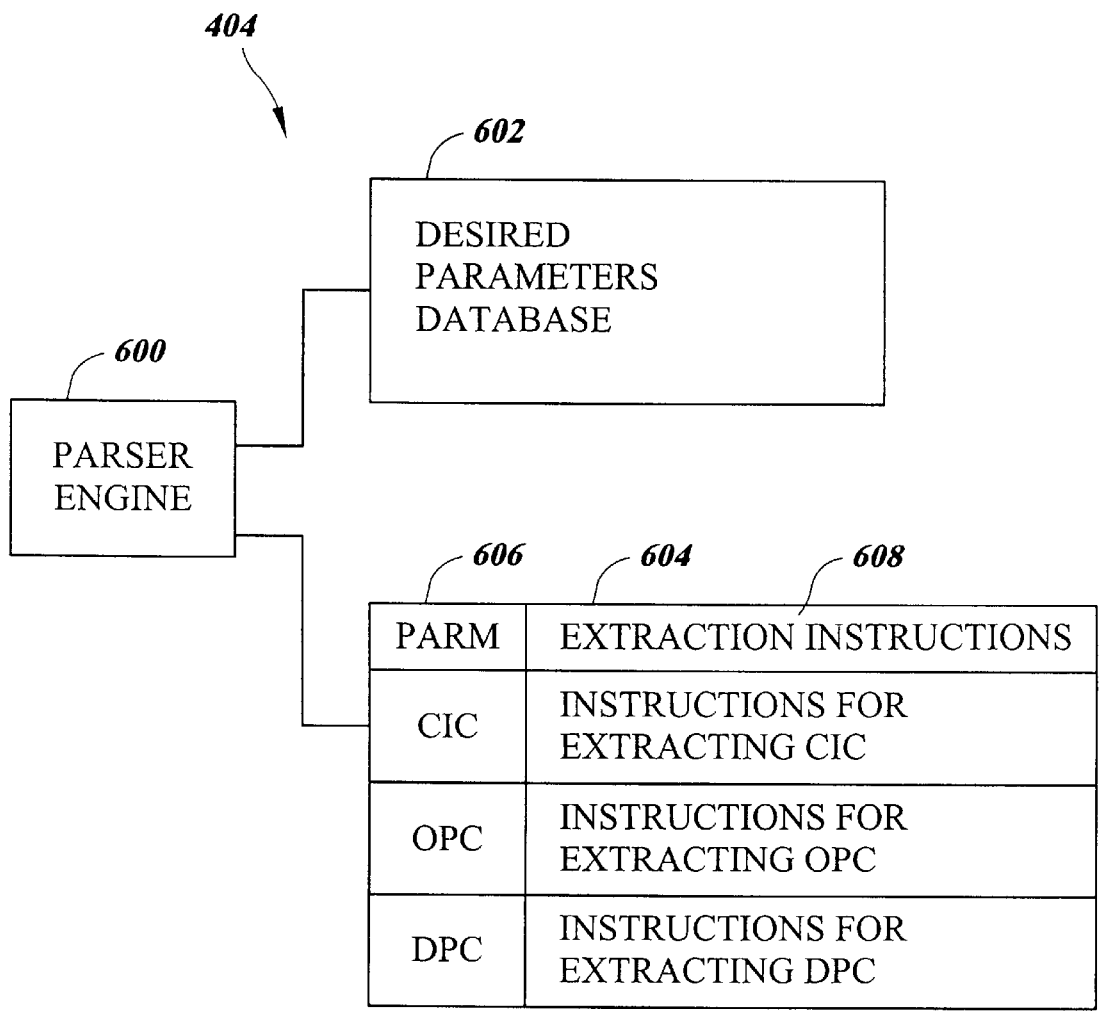
FIG. 6 is a block diagram of a parser according to an embodiment of the present invention.

FIG. 6 is a block diagram illustrating exemplary components of parser 404. In FIG. 6, parser 404 includes a parser engine 600, a user-configurable desired parameters database 602, and a parameter extraction instructions database 604. Parser engine 600 is a program configured to read desired message parameters information from database 602 to determine the parameters to extract from incoming MSUs. Parser engine 600 then reads instructions for extracting the desired parameters form database 604 and follows the instructions to extract the desired parameters.

Desired parameters database 602 contains parameters that are desired to be extracted from incoming MSUs. In a preferred embodiment, desired parameters database 602 comprises a user-editable text file that allows a user to set parameters to be extracted from MSUs, according to the needs of a particular application. For example, a call duration billing application may require CIC, OPC and DPC values. The database user may configure database 602 to include these desired parameters. Accordingly, when parser engine 600 receives an MSU, parser engine 600 reads each desired parameter listed in database 602 and attempts to extract the parameter using instructions provided in database 604.

Database 604 contains instructions for extracting parameters from MSUs. For example, each entry in database 604 may include a first field 606 that corresponds to one of the desired parameters in database 602 and a second field 608 that contains instructions for extracting the desired parameter. For example, parameters for first field 606 may include CIC, OPC, and DPC. Exemplary instructions for extracting the CIC from an MSU are as follows:

1) Go to offset for SIO
2) Compare SIO value to value for ISUP
3) If SIO value=ISUP, go to offset for CIC
4) Extract CIC Instructions for extracting other parameters that are included in all MSUs, such as OPC and DPC, may simply involve going to the offset and reading the value. Still other parameters, such as Called Party (CdPA) and Calling Party (CgPA) require extremely complex instructions. For example, in order to extract the CdPA parameter, the instructions are as follows:

1. Goto offset for SIO;
2. Compare SIO value to value designated for ISUP;
3. If SIO value is equal to ISUP value, then goto offset for ISUP message type;
4. If ISUP message type is equal to Initial Address Message (IAM), then goto offset for CdPA number pointer;
5. Add contents of CdPA number pointer to current offset;
6. Get length of CdPA number;
7. Add two octets to offset; and
8. Get variable length CdPA number.

Using a user-configurable text file and an extraction instructions database to control parameter extraction from MSUs makes parser functionality easily modifiable. A user need not know anything more than the parameter name to extract the parameter. The parameter extraction instructions database removes the need for the user to remember how or where to locate a parameter. Thus, the parser according to the present embodiment can be easily configured to extract MSU parameters for a variety of applications.

Figure 7:
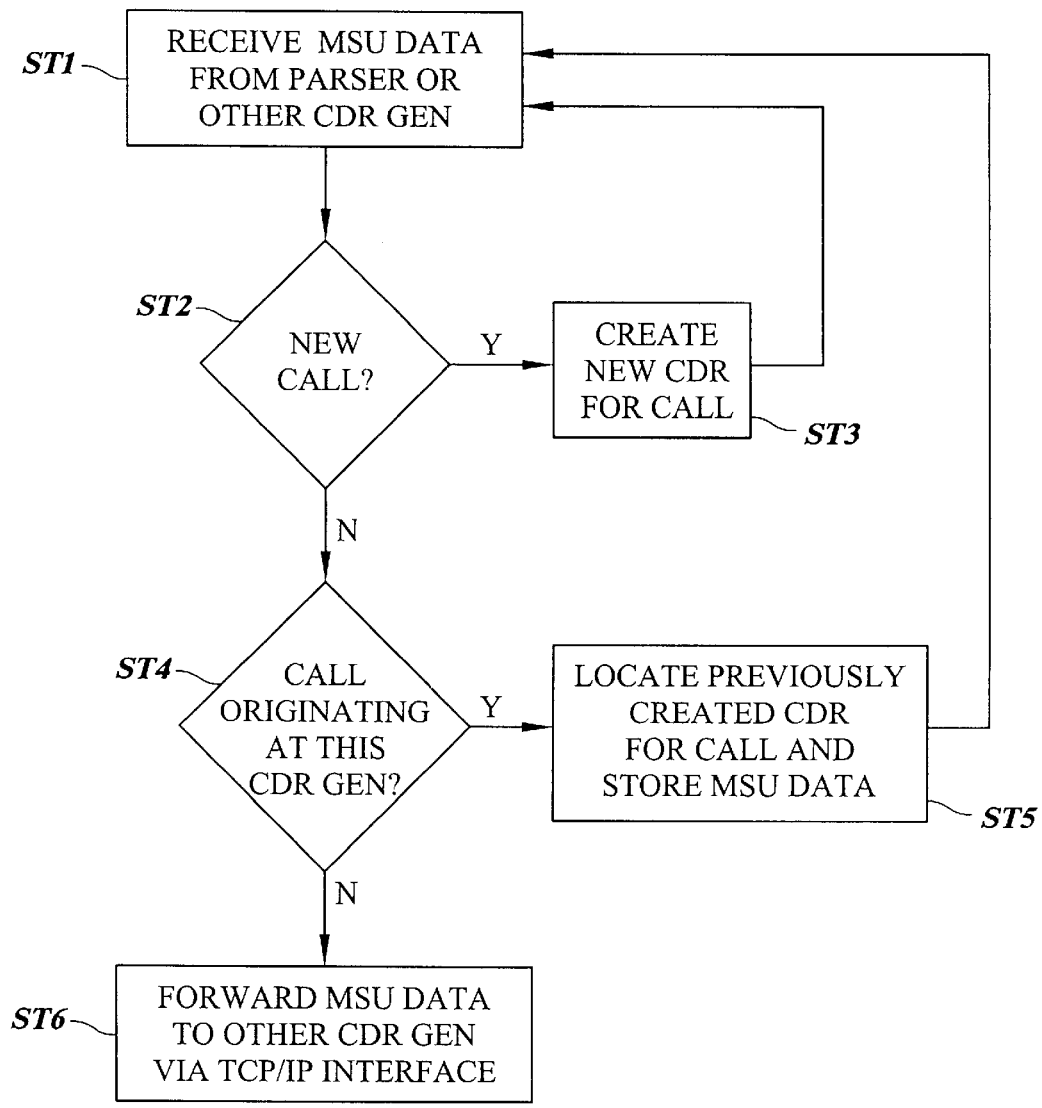
FIG. 7 is a flow chart illustrating exemplary steps that may be performed by the correlator of the CDR generator program in correlating ISUP messages according to an embodiment of the present invention.

Once parser 404 parses an incoming MSU, the parsed message is forwarded to correlator 406 for correlation processing. FIG. 7 illustrates exemplary steps that may be performed by correlator 406 illustrated in FIG. 4 in correlating ISUP messages. The steps illustrated in FIG. 7 assume a configuration similar to that illustrated in FIG. 1 where a CDR generator program is associated with each STP of a mated pair of STPs.

It is understood that the steps illustrated in FIG. 7 may be implemented as computer program product including computer-executable instructions embodied in a computer readable medium. Alternatively, the steps illustrated in FIG. 7 may be implemented in hardware, such as an application-specific integrated circuit. Any combination of hardware and software for performing the steps illustrated in FIG. 7 or any of the other MSU or CDR processing steps described herein is within the scope of the invention.

Referring to FIG. 7, in step ST1, correlator 406 receives MSU data from parser 404 or from the other CDR generator. The MSU data includes fields extracted by parser 404 for a specific application. In step ST2, correlator 406 determines whether the received MSU data relates to a new call. Determining whether the received MSU data relates to a new call may include examining the ISUP message type. For example, for ISUP messages, if the message is an IAM message, correlator 406 may determine that the message relates to a new call. In step ST2, if correlator 406 determines that the message relates to a new call, in step ST3 correlator 406 creates a new CDR for the call. Correlator 406 then returns to step ST1 to process the next message.

In step ST2, if correlator 406 determines that the message does not relate to a new call, in step ST4 correlator 406 then determines whether the message relates to the call originating at the receiving CDR generator program. In order to make this determination, correlator 406 preferably compares one or more fields from the MSU data to a database of active CDRs at the receiving site. If correlator 406 determines that the MSU relates to a call originating at the receiving CDR generator program, in step ST5 correlator 406 locates the previously created CDR for the call and stores the MSU data in that record. In step ST4, if correlator 406 determines that the call did not originate at this CDR generator program, in step ST6 correlator 406 forwards the MSU data to the other CDR generator program. The other CDR generator program receives the MSU data and performs the same steps illustrated in FIG. 7 to store the MSU data in the same steps in the appropriate CDR. Thus, by forwarding MSU data to the CDR generator that originally created the CDR, correlator 406 according to the present embodiment greatly simplifies CDR correlation over prior art systems.

Figure 8:
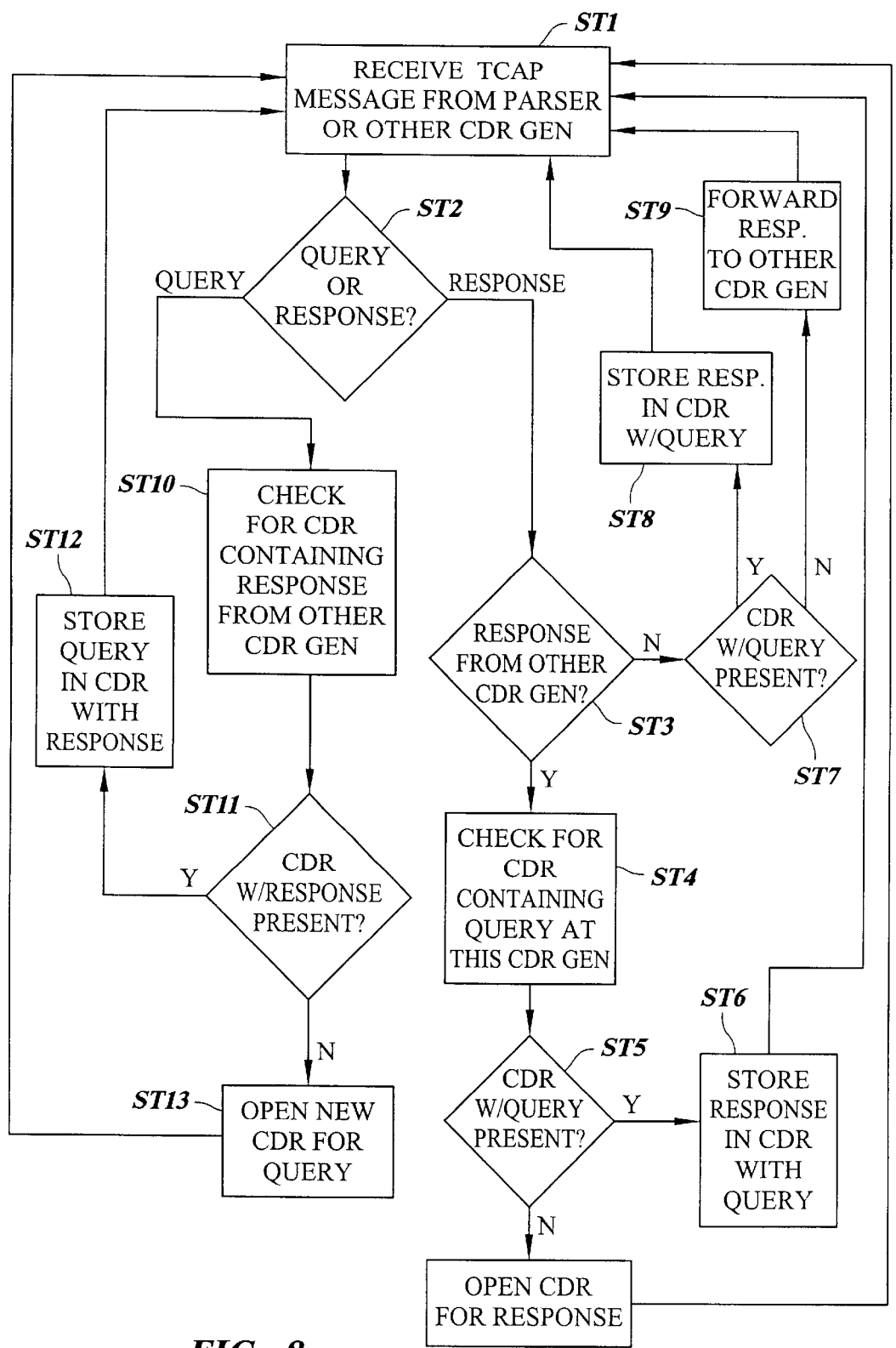
FIG. 8 is a flow chart illustrating exemplary steps that may be performed by a correlator of a CDR generator program in processing TCAP messages according to an embodiment of the present invention.

While FIG. 7 illustrates exemplary correlation processing for ISUP messages, FIG. 8 illustrates exemplary correlation processing for TCAP messages. Like the steps illustrated in FIG. 7, the steps illustrated in FIG. 8 assume a configuration similar to that illustrated in FIG. 1 where a CDR generator program is associated with each STP of a mated pair of STPs. The steps illustrated in FIG. 8 generate a CDR at one or the other monitoring devices for a TCAP query and response. The steps illustrated in FIG. 8 are designed to generate a correct CDR even when a race condition occurs due to detection of a TCAP response by a monitoring device before detection of a TCAP query by the other monitoring device. For example, in TCAP line interface database (LIDB) transactions, the TCAP query may be sent through one STP of a mated pair of STPs and the response may be sent through the other STP of the mated pair. If monitoring devices are deployed at both STPs of the mated pair, for example as illustrated in FIG. 1, one monitoring device may receive a LIDB response before the other monitoring device receives the LIDB query. The steps illustrated in FIG. 8 demonstrate correlation of the query and response to generate a single correct CDR at one of the STPs, even when this condition occurs.

Referring to FIG. 8, in step ST1 correlator 406 receives a TCAP message from the parser or from the other CDR generator program. The TCAP message may be an entire TCAP MSU or any subset of the fields required for CDR generation. In step ST2, correlator 406 determines whether the TCAP message is a query or a response. If the TCAP message is a response, in step ST3 correlator 406 determines whether the response was sent from the other CDR generator program. This condition occurs if the other CDR generator program received the response and did not have a CDR file query corresponding to the response. If in step ST3 correlator 406 determines that the response originated from the other CDR generator, in steps ST4 and ST5 correlator 406 determines whether a CDR containing a query corresponding to the response is present at this CDR generator. This determination may include comparing fields in the response to fields in an active CDR database. If a CDR with a query corresponding to the response is present, in step ST6 correlator 406 stores the response in the CDR with the query and returns to step ST1 to process the next message. If a CDR with a query corresponding to the response is not present, in step ST7 correlator 406 opens a CDR for the response and returns to step ST1 to process the next message.

In step ST3, if correlator 406 determines that the response is not from the other CDR generator, then the response was received from the parser at this CDR generator. Accordingly, in step ST7 correlator 406 checks for a CDR containing the query corresponding to the response at this CDR generator. In step ST8, if a CDR containing the query is present, correlator 406 proceeds to step ST9 and stores the response in the CDR with the query. Correlator 406 then returns to step ST1 to process the next message. In step ST7, if correlator 406 determines that a CDR with a query corresponding to the response is not present, in step ST9 correlator 406 forwards the response to the other CDR generator. Correlator 406 then returns to step ST1 to process the next message.

In step ST2, if correlator 406 determines that the TCAP message received from the parser is a query, in steps ST10 and ST11 correlator 406 checks for a CDR containing a response forwarded from the other CDR generator program. In step ST11, if correlator 406 determines that a response CDR is present, in step ST12 correlator 406 stores the query in the CDR with the response. Correlator 406 then returns to step ST1 to process the next message. In step ST11, if correlator 406 determines that a response CDR is not present, in step ST13 correlator 406 opens a new CDR for the query and stores the query in that CDR. Correlator 406 then returns to step ST1 to process the next message.

As stated above, the steps performed by correlator 406 in FIG. 8 avoid race conditions. For example, if a response is received at one CDR generator before the other CDR generator receives a query, the response is forwarded to the other CDR generator. The other CDR generator, in response to receiving the response forwarded from the first CDR generator, opens a new CDR containing the response. When the query arrives at the CDR generator that received the forwarded response, the CDR generator stores the query in the CDR containing the forwarded response. In this manner, proper CDRs are created for TCAP transactions, such as LIDB transactions, even when race conditions occur.

CDR Manager

Figure 9:
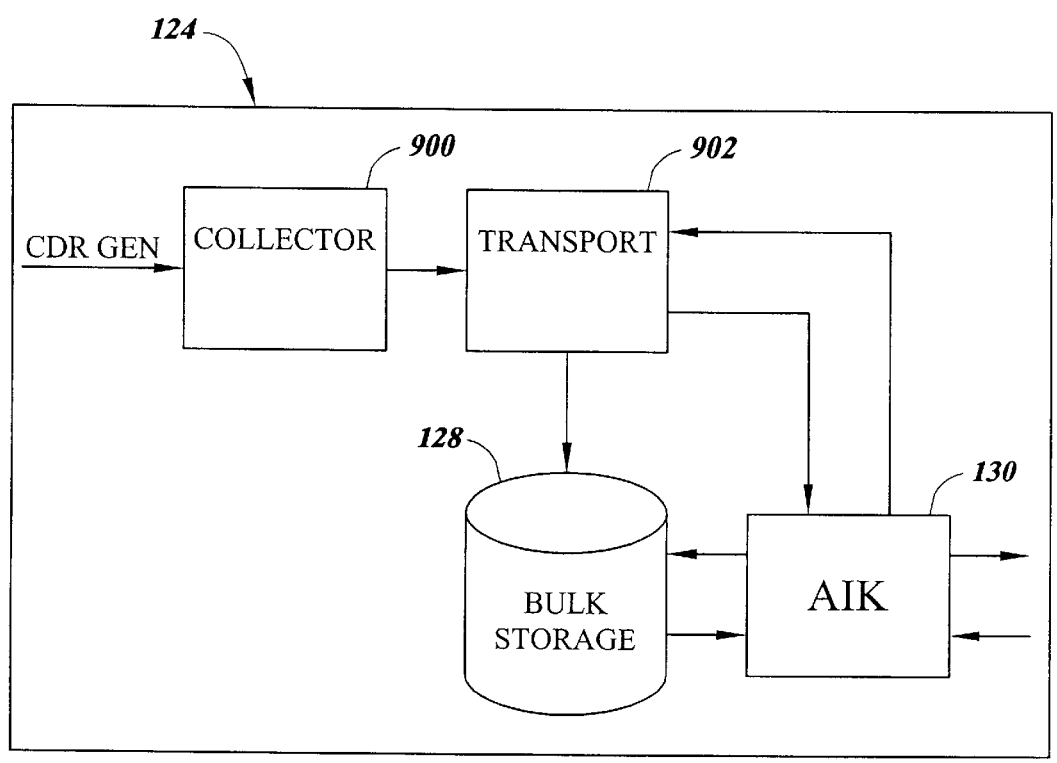
FIG. 9 is block diagram of CDR manager program according to an embodiment of the present invention.

Once the CDR generator creates a CDR, the CDR is forwarded to a CDR manager for storage. FIG. 9 is a block diagram of CDR manager 124 illustrated in FIG. 2. In FIG. 9, CDR manager includes a collector 900 for receiving CDRs from transport block 410 illustrated in FIG. 4. Communication with transport block 410 may occur using any suitable protocol for transferring data, such as FTP. Transport block 902 receives CDRs from collector 900 and transports the CDRs to bulk storage 128 via a suitable network communications protocol, such as TCP/IP or UDP/IP.

According to an important aspect of the invention, CDR manager 132 includes an application interface kit 130 that allows third party applications to access CDRs and/or MSUs stored in bulk storage 128. Application interface kit 130 includes a set of application programming interfaces (APIs) that allows applications to access CDRs and/or MSUs in both real time and in bulk. By "real time" it is meant that application interface kit 130 allows an application to change the flow and/or content of CDRs and/or MSUs received by the application in a short time period, e.g., on the order of milliseconds or seconds.

Application interface kit 130 includes two separate halves. The first half is a server. The application interface kit server can be part of the CDR manager program and handles all commands and requests from the second half of the application interface kit, the AIK client. In addition, or in the alternative, the application interface kit server can be part of the CDR generator program as illustrated in FIG. 4. The application interface kit client is linked into a user application and provides commands that the user application can send to the application interface kit server. The application interface kit server and the application interface kit client can communicate with each other via a TCP/IP connection or other appropriate protocol.

Figures 10A, 10B:
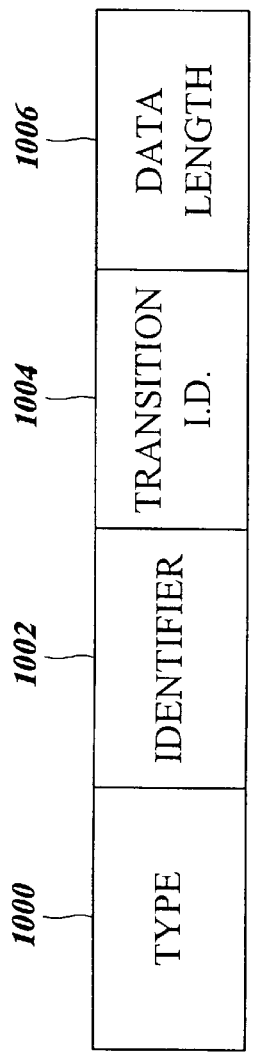

FIG. 10(a) illustrates an exemplary CDR generator command data structure provided by application interface kit 130. In FIG. 10a, the CDR generator command includes a type field 1000, a command identifier field 1002, a transaction identifier field 1004, and a data length field 1006. In the illustrated example, each field is encoded as one byte in the command data structure. The entire command is encapsulated in a network packet, such as a TCP segment or a UDP datagram, and transmitted between the application and the CDR manager or CDR generator.

FIG. 10(b) illustrates exemplary values for command type field 1000 illustrated in FIG. 10(a). In FIG. 10(b), the first column 1010 includes the bit pattern that encodes each command type. The second column 1012 includes a description of each command type. For example, the bit pattern 000001 identifies a GET command. The GET command is used to obtain attributes from the CDR manager or CDR generator and statistical information regarding generated CDRs. Examples of attributes that may be obtained are AIK Version, which is associated with compatibility checking, and Active Links, which returns a listing of links with currently active CDR generation. The bit pattern 00000010 identifies the SET command. The SET command is used to control behavior of the CDR generator or CDR manager. For example, the SET command may be used to stop and start the flow of CDRs or MSUs in real time. The bit pattern 0000100 identifies the RESPONSE command. The RESPONSE command is a response to the CDR generator command. Finally, the bit pattern 00001000 identifies the TRAP message. The TRAP message is an asynchronous message sent from the a CDR generator program or CDR manager program to an application to provide real time information to the application about ongoing processes. For example, a TRAP CDR message contains information associated with one or more CDR records, and a TRAP Error message contains information associated with error conditions in the system.

FIG. 10(c) illustrates exemplary identifiers that may be transmitted in identifier field 1002 of a CDR generation message. In the illustrated table, the first column 1014 includes a bit pattern for each of the supported identifiers. The second column 1016 includes a brief description of each identifier function. In the illustrated table, the bit pattern 00000000 instructs the application interface kit server to stop sending CDRs in real time. The bit 00000001 instructs the application interface kit server to start sending CDRs in real time without filtering. As used herein, filtering refers to the filtering of MSUs or CDRs based on parameters in the MSUs or CDRs. Instructing the application interface kit server to send CDRs in real time without the filtering means that the CDR generator or CDR manager will send all CDRs created.

Figure 11:
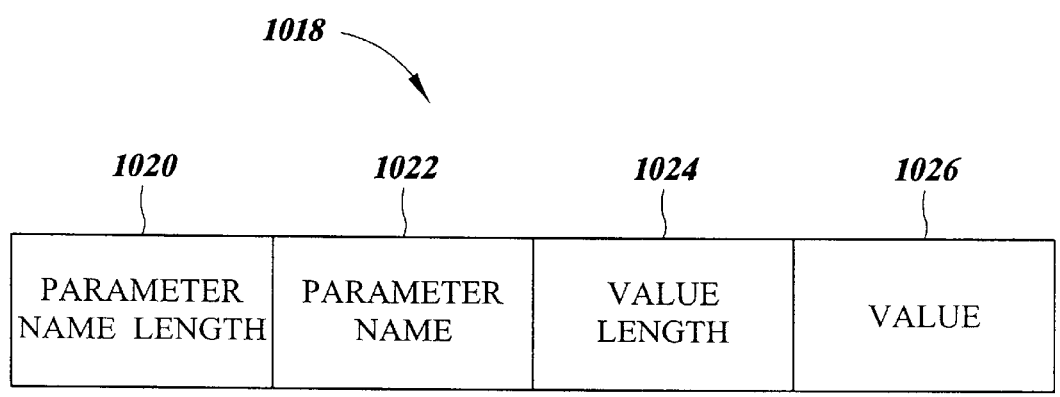
FIG. 11 is a data structure diagram illustrating a data filter command usable by applications to control filtering of MSUs and CDRs according to an embodiment of the present invention.

The bit pattern 10000001 instructs the application interface kit server to start sending CDRs in real time with filtering. A command to start sending CDRs in real time with filtering will be followed by a command that specifies the filtering criteria. FIG. 11 illustrates an exemplary data structure for a filter message. In FIG. 11, filter message 1018 includes a parameter name length field 1020, a parameter name field 1022, a value length field 1024, and a value field 1026. Parameter name length field 1020 stores a value that represents the length of the parameter in an appropriate unit, such as bits or bytes. Parameter name field 1022 includes a name for the parameter that is recognizable by the application interface kit server. Exemplary parameter names that may be used as filter criteria includes OPC, DPC, SIO, CIC, etc. Value length field 1024 includes the length of value field 1026, in any appropriate units such as bytes or bits. Value field 1026 includes the value of the parameter specified in parameter name field 1022. For example, if the parameter specified in parameter name field 1022 is OPC, the value specified in value field 1026 may be 2-0-0. In another example, parameter name field 1022 may specify an IP address. In this case, an exemplary value that may be stored in value field 1026 is 255.255.255.255. Thus, by allowing applications to send filtering messages and control filtering in real time, the application interface kit according to embodiments of the present invention allows real time control of MSUs and CDRs received by an application.

Referring back to FIG. 10(*c*), bit pattern 0000010 instructs the application interface kit server to start sending intermediate CDRs in real time without filtering. As used herein, intermediate CDRs refer to CDRs that may not be complete. For example, in a CDR created for a call duration billing application, an intermediate CDR may be some but not all of the messages used to perform call setup or call teardown. Bit pattern 1000100 instructs application interface kit server to start sending intermediate CDRs in real time with filtering. As stated above, such a message is preferably followed by a filtering message, which instructs application interface kit server of the filter criteria.

Bit pattern 00000100 instructs the application interface kit server to stop sending MSUs in real time. Bit pattern 00001000 instructs application interface kit server to start sending MSUs in real time without filtering. Bit pattern 10001000 instructs application interface kit server to start sending MSUs in real time with filtering. These commands are similar to the commands described above with regard to CDRs and a description thereof is not repeated herein.

Figure 12:
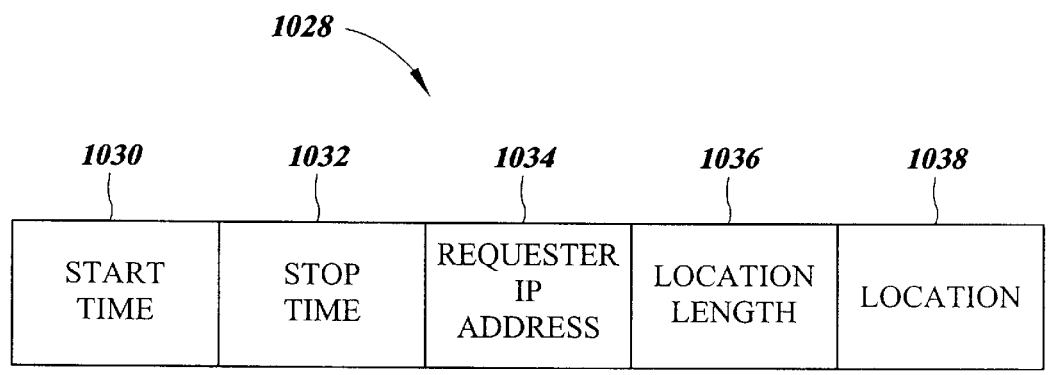
FIG. 12 is a data structure diagram illustrating a bulk delivery command usable by applications to request delivery of CDRs and MSUs in bulk.

Bit pattern 0001000 instructs application interface kit server to retrieve CDRs in bulk. A SET message containing an identifier to get CDRs in bulk is followed by a CDR/MSU bulk data request message. FIG. 12 illustrates an exemplary data structure for a CDR/MSU bulk data request message. In FIG. 12, bulk data request message 1028 includes start time field 1030, stop time field 1032, requester IP address field 1034, location length field 1036, and location field 1038. Start and stop time fields 1030 and 1032 specify the range of time for which CDRs are requested. For example, it may be desirable to request all CDRs generated from 8:00 am to 5:00 pm during a given day. Requestor IP address field 1034 stores the IP address of the application requesting the CDRs. Location length field 1036 specifies the length of the storage field location. Finally, location field 1038 specifies the location on the application interface kit server for storing CDRs.

In response to receiving bulk data request message 1028, application the interface kit server extracts the appropriate CDRs from bulk storage and initiates an appropriate bulk file transfer protocol such as FTP, to communicate the CDRs to the application interface kit client. Thus, the application interface kit according to embodiments of the present invention allows application to control bulk processing of CDRs.

Referring back to FIG. 10(*b*), bit pattern 001000000 instructs the application interface kit server to retrieve MSUs in bulk. The operation of this command is similar to the command for retrieving CDRs in bulk. Hence, a description thereof is not repeated herein. Bit pattern 01000000 instructs the receiving entity to send user configuration information to the requester. Exemplary user configuration information that may be sent in response to this command includes the monitoring software version of the receiver.

As illustrated in FIGS. 10*a*–10*c*, 11, and 12, the application interface kit provides a mechanism for controlling the flow and content of CDRs and/or MSUs in real time. This controllability by applications facilitates application design without requiring modification to the CDR generation or management software. Accordingly, embodiments of the present invention facilitate development of applications that utilize CDRs or MSUs. Examples of such applications include call duration billing, call duration billing verification, interconnect billing verification, looping detection, mass call detection, fraud detection, such as calling card fraud detection, etc.

CDR Examples

Both call duration billing and fraud detection applications may require CDRs containing a record of ISUP messages exchanged during a call. An example of ISUP CDR content is as follows:

Initial address message (IAM)
        Time stamp
        OPC
        DPC
        Called party number
        Carrier identification
        Generic address
        Generic digits
        Generic name
        Original called number
        Redirecting number
        Redirection information
        User service information
        Charge number
        Calling party number
    Answer message (ANM)
        Time stamp
    Release message (REL)
        Time stamp
    Release calls Another example of CDR content that may be generated by embodiments of the present invention includes TCAP messages. Such CDRs may be generated for an interconnect billing application, an interconnect billing verification application, or a calling card fraud detection application. An example of TCAP CDR content is as follows:

LIDB query message
        Time stamp
        OPC
        DPC
        Transaction ID (TXID)
        PIN number
        Billing number
        Calling party number
        Called party number
        LIDB normal response message
        LIDB error response message
        Company ID
        PIN restriction
        Record status
        CCAN service denial
        PIN service denial The present invention is not limited to generating the CDRs listed above. As stated earlier, the present invention is adaptable to generate CDRs containing any content from an SS7 MSU. Such content is modifiable simply by altering desired parameters in the parameters database accessed by the parser or by sending filtering commands to the application interface kit server.

It will be understood that various details of the invention may be changed without departing from the scope of the invention. Furthermore, the foregoing description is for the purpose of illustration only, and not for the purpose of limitation—the invention being defined by the claims.

What is claimed is:

1. A system for collecting and processing SS7 message signal units (MSUs), the system comprising:
   (a) a link interface for copying SS7 MSUs from at least one of an SS7 signaling link and a TCP/IP signaling link;
   (b) a call detail record (CDR) generator in communication with the link interface for receiving MSUs copied by the link interface and parsing the MSUs to extract parameters from the MSUs; and
   (c) an application interface kit for receiving commands from an application and controlling the flow of the parameters to the application in real time.

2. The system of claim 1 wherein the application interface kit is responsive to commands for delivering CDRs to the application in real time.

3. The system of claim 1 wherein the application interface kit is responsive to commands for delivering MSUs to the application in real time.

4. The system of claim 1 wherein the application interface kit includes a server for receiving the commands and accessing CDRs and MSUs produced by the CDR generator in response to the commands and a client for linking with the application and providing the commands to the server.

5. The system of claim 4 wherein the client and the server communicate via a TCP/IP connection.

6. The system of claim 4 wherein the client and the server communicate using UDP/IP datagrams.

7. The system of claim 1 wherein the application interface kit is responsive to commands for delivering CDRs to the application in bulk.

8. The system of claim 1 wherein the application interface kit is responsive to commands for filtering the MSU parameters delivered to the application in real time.

9. The system of claim 1 wherein the link interface, the call detail record generator, and the application interface kit are adapted to be co-located with and external to a signal transfer point (STP).

10. The system of claim 1 wherein the link interface, the call detail record generator, and the application interface kit are adapted to be internal to a signal transfer point (STP).

11. A system for generating call detail records (CDRs), the system comprising:
   (a) first and second monitoring units, the first monitoring unit being associated with a first signal transfer point of a mated pair of signal transfer points for copying message signal units (MSUs) traversing the first signal transfer point, the second monitoring unit being associated with a second signal transfer point of the mated pair of signal transfer points for copying MSUs traversing the second signal transfer point;
   (b) first and second CDR generators, the first CDR generator being coupled to the first monitoring unit and the second CDR generator being coupled to the second monitoring unit, wherein the first CDR generator includes:
      (b)(i) a first receiver for receiving first SS7 MSU parameters generated by the second CDR generator;
      (b)(ii) a first collector for receiving the SS7 MSUs copied by the first monitoring unit;
      (b)(iii) a first parser coupled to the first collector for receiving the MSUs from the first collector and parsing the MSUs to produce second MSU parameters; and
      (b)(iv) a first correlator coupled to the first parser and the first receiver for receiving the first and second MSU parameters and producing correlated call detail records from the MSU parameters, wherein the first correlator identifies MSU parameters for transactions originating at the signal transfer point associated with the second CDR generator and forwards the MSU parameters to the second CDR generator without generating a partial CDR at the first CDR generator.

12. The system of claim 11 wherein the parser comprises:
   (a) a desired parameters database for storing parameters to be included in the CDRs;
   (b) an extraction instructions database for storing instructions for extracting parameters from the MSUs; and
   (c) a parser engine for accessing the desired parameters database and the extraction instructions database to extract parameters from the MSUs.

13. The system of claim 12 wherein the desired parameters database includes an originating point code (OPC) parameter, a destination point code (DPC) parameter, and a circuit identification code (CIC) or Transaction ID (TXID) parameter, and the extraction instructions database includes instructions for extracting the OPC, DPC, CIC and TXID parameters from an MSU.

14. The system of claim 11 wherein the first correlator is adapted to produce CDRs including ISDN user part (ISUP) MSUs for a call duration billing application.

15. The system of claim 11 wherein the first correlator is adapted to produce CDRs including transaction capabilities application part (TCAP) MSUs for a billing or billing verification application.

16. The system of claim 11 wherein the first correlator is adapted to produce CDRs including ISDN user part (ISUP) and transaction capabilitites application part (TCAP) MSUs for a calling card fraud detection application.

17. The system of claim 11 wherein the first correlator is adapted to produce CDRs including ISDN user part (ISUP) and transaction capabilitites application part (TCAP) MSUs for a looping detection application.

18. The system of claim 11 wherein the first correlator is adapted to produce CDRs including ISDN user part (ISUP) MSUs and transaction capabilitites application part (TCAP) MSUs for a mass call detection application.

19. The system of claim 11 comprising a CDR manager coupled to the first correlator for receiving the call detail records from the first correlator and storing the CDRs in a bulk storage medium.

20. The system of claim 19 comprising an application interface kit associated with the CDR manager for allowing an application to access the CDRs stored in the bulk storage medium.

21. The system of claim 20 wherein the application interface kit includes a server associated with the CDR manger for processing commands received from the application for accessing the CDRs in the bulk storage medium and a client associated with the application for generating the commands.

22. The system of claim 21 wherein the client is adapted to produce a filter command for instructing the server to filter CDRs extracted from the bulk storage medium.

23. The system of claim 21 wherein the client is adapted to produce a CDR generation command for instructing the server to send CDRs extracted from the bulk storage medium to the client.

24. The system of claim 21 wherein the client is adapted to produce a stop command for instructing the server to stop sending CDRs extracted from the bulk storage medium to the client.

25. A method for generating call detail records (CDRs) based on SS7 message signal units (MSUs), the method comprising:
   (a) at a first monitoring device coupled to a first signaling link associated with a first signal transfer point of a mated pair of signal transfer points, receiving, from the first signaling link, a first SS7 MSU associated with a first call;
   (b) extracting at least one parameter from the first SS7 MSU;
   (c) determining whether a call detail record exists for the first call at the first monitoring device based on the parameter;
   (d) in response to determining that a call detail record does not exist at the first monitoring device, forwarding the parameter to a second monitoring device coupled to a second signaling link associated with a second signal transfer point of the mated pair of the signal transfer points without generating a CDR or a partial CDR for the first call at the first monitoring device; and
   (e) generating a CDR at the second monitoring device.

26. The method of claim 25 wherein receiving a first SS7 MSU includes receiving a first IDSN user part (ISUP) MSU.

27. The method of claim 25 wherein forwarding the parameter to the second monitoring device includes forwarding the parameter over a TCP/IP interface.

28. The method of claim 25 wherein forwarding the parameter to the second monitoring device includes forwarding the first parameter over a UDP/IP interface.

29. The method of claim 25 comprising, in response to receiving the parameter at the second monitoring device, creating a call detail record for the parameter.

30. The method of claim 25 wherein forwarding the parameter to second monitoring device includes forwarding the parameter without creating a CDR at the first monitoring device.

31. The method of claim 25 wherein receiving the first SS7 MSU from the first signal link includes receiving the first SS7 MSU from a first SS7 signaling link.

32. The method of claim 25 wherein receiving the first SS7 MSU from the first signaling link includes receiving the first SS7 MSU from a first TCP/IP signaling link.

33. A method for generating call detail records based on transaction capabilities application part (TCAP) message signal units (MSUs), the method comprising:
   (a) at a first monitoring device, receiving a TCAP response MSU;
   (b) extracting at least one response parameter from the TCAP response MSU;
   (c) determining whether a CDR associated with a query corresponding to the TCAP response MSU is present at the first monitoring device based on the response parameter; and
   (d) in response to determining that the CDR associated with the query is not present, forwarding the response parameter to a second monitoring device without generating a CDR or a partial CDR at the first monitoring device.

34. The method of claim 33 comprising:
   (e) at the second monitoring device, receiving the response parameter forwarded from the first monitoring device;
   (f) determining whether a CDR associated with a query corresponding to the response parameter is present at the second monitoring device; and
   (g) in response to determining that the CDR is not present at the second monitoring device, opening a CDR for the response parameter at the second monitoring device and storing the response parameter in the CDR at the second monitoring device.

35. The method of claim 34 comprising, at the second monitoring device, in response to receiving a TCAP query MSU corresponding to the TCAP response MSU, extracting at least one query parameter from the MSU and storing the query parameter in the CDR at the second monitoring device containing the response parameter.

36. A computer program product comprising computer-executable instructions embodied in a computer-readable medium for performing steps comprising:
   (a) parsing first message signal units (MSUs) copied from at least one of an SS7 signaling link and a TCP/IP signaling link associated with a first signal transfer point (STP) to produce first MSU parameters;
   (b) receiving second MSU parameters derived from MSUs copied from at least one of an SS7 signaling link and a TCP/IP signaling link associated with a second signal transfer point;
   (c) correlating the first and second MSU parameters to produce call detail records (CDRs);
   (d) receiving commands from an application for controlling the flow of CDRs to the application; and
   (e) controlling, in real time, the flow of CDRs to the application based on the commands.

37. The computer program product of claim 36 wherein receiving commands from an application includes receiving a command for delivering CDRs to the application in real time and wherein controlling the flow of CDRs to the application includes delivering the CDRs to the application in real time.

38. The computer program product of claim 36 comprising receiving a filter command for filtering CDRs delivered to the application and filtering the CDRs delivered to the application based on the filter command.

39. The computer program product of claim 38 wherein receiving a filter command includes receiving a filter command including at least one MSU parameter value and wherein filtering the CDRs delivered to the application includes transmitting CDRs to the application having the MSU parameter value.

40. The computer program product of claim 36 wherein parsing SS7 MSUs includes reading desired parameters from a desired parameters database, reading instructions for extracting the desired parameters from an extraction instructions database, and extracting the desired parameters from the MSUs based on the instructions.

41. The computer program product of claim 36 wherein correlating the first and second MSU parameters includes creating a single call detail record for the first and second MSU parameters.

42. The system of claim 11 wherein the second CDR generator comprises:
   (a) a second receiver for receiving the MSU parameters forwarded by the first CDR generator;
   (b) a second collector for receiving SS7 MSUs copied by the second monitoring unit;

(c) a second parser coupled to the second collector for parsing the MSUs to produce MSU parameters;

(d) a second correlator coupled to the second parser and the receiver for producing correlated CDRs and for identifying MSU parameters for transactions originating at the signal transfer point associated with the first CDR generator and for forwarding the MSU parameters to the first CDR generator without generating a CDR or a partial CDR at the second CDR generator.

43. A signal transfer point comprising:

(a) a link interface module for sending and receiving SS7 message signal units (MSUs) via SS7 signaling links:

(b) a first MSU copy module operatively associated with the link interface module for copying the MSUs received by the link interface module;

(c) a data communications module for sending and receiving IP-encapsulated SS7 MSUs over IP data links;

(d) a second MSU copy module operatively associated with the data communications module for copying the SS7 MSUs received over the IP data links; and (e) a CDR generator operatively associated with the first and second MSU copy modules for generating CDRs based on the copied MSUs.

* * * * *